United States Patent
Walker et al.

(10) Patent No.: US 7,025,360 B2
(45) Date of Patent: Apr. 11, 2006

(54) METAL SEAL WITH CORROSION RESISTANT ALLOY OVERLAY

(75) Inventors: James M. Walker, Houston, TX (US); Lionel Milberger, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 0 days.

(21) Appl. No.: 10/671,262

(22) Filed: Sep. 25, 2003

(65) Prior Publication Data

US 2004/0056432 A1   Mar. 25, 2004

Related U.S. Application Data

(60) Provisional application No. 60/413,332, filed on Sep. 25, 2002.

(51) Int. Cl.
   *F16J 15/02*   (2006.01)
   *F16L 19/06*   (2006.01)

(52) U.S. Cl. ............... 277/652; 277/627; 285/334.2; 285/341

(58) Field of Classification Search ............ 277/608, 277/627, 650, 652, 653, 654; 285/341, 334.2
See application file for complete search history.

(56) References Cited

U.S. PATENT DOCUMENTS

| | | | |
|---|---|---|---|
| 2,376,017 A | * | 5/1945 | Smallpeice ................. 277/626 |
| 3,307,860 A | * | 3/1967 | Blount et al. ................. 285/55 |
| 3,507,506 A | * | 4/1970 | Tillman ...................... 277/614 |
| 3,556,568 A | * | 1/1971 | King ....................... 285/334.2 |
| 4,336,958 A | * | 6/1982 | Goetzinger .................. 285/55 |
| 4,470,609 A | * | 9/1984 | Poe .......................... 285/334.2 |
| 4,635,967 A | * | 1/1987 | Stephenson .................. 285/45 |
| 5,103,915 A | * | 4/1992 | Sweeney et al. ............ 166/379 |
| 6,070,911 A | * | 6/2000 | Namikawa et al. ........... 285/48 |
| 6,322,087 B1 | * | 11/2001 | Swensen et al. ............ 277/626 |
| 6,409,176 B1 | | 6/2002 | Allen |
| 6,561,521 B1 | * | 5/2003 | Janoff et al. ................. 277/603 |
| 6,722,426 B1 | | 4/2004 | Sweeney |

FOREIGN PATENT DOCUMENTS

| | | |
|---|---|---|
| GB | 2377976 A | 6/2002 |
| GB | 2377976 A * | 1/2003 |

* cited by examiner

*Primary Examiner*—Alison K. Pickard
(74) *Attorney, Agent, or Firm*—Browning Bushman P.C.

(57) ABSTRACT

A composite metal sealing ring and method are provided for sealing between tubular members. First and second tubular members have first and second conical inner sealing surfaces. A metal sealing ring has corrosion-resistant inlays defining opposing conical outer sealing surfaces for sealing with the first and second conical inner sealing surfaces. The resulting composite sealing ring has the corrosion-resistant benefits of stainless steel at the sealing surfaces, along with the desired expansion ratio of a conventional carbon steel.

29 Claims, 4 Drawing Sheets

METAL SEAL WITH CORROSION RESISTANT ALLOY OVERLAY

CROSS-REFERENCE TO RELATED APPLICATIONS

This application is related to and claims benefit of U.S. Provisional Application Ser. No. 60/413,332 filed Sep. 25, 2002 and assigned to the assignee of the present application.

FIELD OF THE INVENTION

The present invention relates to sealing rings for sealing between oilfield tubular members. More particularly, the invention relates to a composite metal sealing ring having a corrosion resistant inlay and a carbon steel body, and a method of using same.

BACKGROUND OF THE INVENTION

Metal seal rings are commonly used in the hydrocarbon recovery industry to seal between joined tubular members. These seal rings are available in a variety of configurations, such as AX, BX, CX, DX, RX, and VX. These generally have a pair of opposing, conical sealing surfaces for sealing under high contact stress with mating sealing surfaces on the tubular members. The sealing surfaces are energized by drawing the tubular members together under high loads so as to deform the sealing surfaces and cause them to be loaded near or beyond yield of the seal material. The high contact stresses provide a tight seal for sealing high pressure fluid such as oil or gas.

The seal rings, which may also be referred to as "gaskets," are commonly made from either a "conventional" steel such as low carbon or low alloy steel that lacks corrosion resistance, or a corrosion resistant steel such as stainless steel or nickel-based "corrosion resistant alloy" (CRA). Both the conventional and corrosion resistant steels gaskets have relatively low yield strength, typically on the order of 30–40 ksi. The conventional steel variety, in particular, have a substantially linear thermal expansion coefficient of approximately 6.0E-6 inches/inch/° F., which is generally the same as or similar to that of the surrounding tubular members. The conventional steel gaskets therefore operate satisfactorily over a wide temperature range on the order of 0–350° F. The stainless steel variety are known to have problems, however, when operating over such a wide temperature range, because they typically have a higher thermal expansion coefficient than the surrounding steel members, such as about 7.0E-6 inches/inch/° F.

Because stainless and conventional steels have similar yield strengths, each will yield when energized in an assembly between tubular members. When the assembly is heated, such as from 0 to 350° F., relatively higher expansion will occur in a stainless steel gasket. A stainless steel gasket will therefore typically yield more, all other factors being equal. This does not usually affect the ability of the stainless steel gasket to seal at the higher temperature. Problems arise, however, when the assembly cools. Because the stainless steel contracts more than the surrounding steel of the tubular members, and because the stainless steel has yielded more at the elevated temperature, contact stresses are reduced at the sealing surfaces upon cooling, and a reliable seal may no longer be possible at the lower temperature.

Recent gasket technology is disclosed in U.S. Pat. No. 5,103,915 to Vetco Gray, and U.S. Pat. No. 6,409,176 to Cooper Cameron. Each of these patents disclose tubular assemblies including both primary and secondary sealing surfaces. Secondary sealing surfaces are provided for sealing in case the primary sealing surface becomes damaged. In addition to damaging circumstances such as erosion, another possible way the primary sealing surface can be damaged is if a typical stainless steel gasket is used, having the problems with expansion described above. The above patents, however, offer a fairly expensive solution to the problem, in that the gasket profiles are more complex, having associated costs and difficulty of manufacture.

In the interests of economy and reliability, it is desirable to manufacture both conventional steel and stainless steel gaskets to identical specifications and tolerances, rather than modify the stainless steel gasket to compensate for its elevated temperature characteristics. Furthermore, it is desirable to increase reliability of traditional gaskets having only primary sealing surfaces, rather than having to rely on the more complicated and expensive gaskets having secondary sealing surfaces, such as disclosed in the above patents. Where expensive secondary sealing surfaces do become necessary, it would still be advantageous to allow for consistency in specifications and tolerances between those gaskets using conventional steel and those using stainless steel. An improved sealing ring or gasket is therefore needed having improved reliability and standardization of manufacturing tolerances, especially when operating over wide temperature ranges.

BRIEF SUMMARY OF THE INVENTION

A high quality bi-metal or "composite" alloy/stainless steel sealing ring or "gasket" is provided for sealing between a pair of oilfield tubular members. The gasket incorporates many of the features of a solid stainless steel gasket, but without the primary disadvantages of a stainless gasket. These gaskets are made of steel with a thin stainless steel or CRA inlay at the mating sealing surfaces between gasket and tubular member. The inlay might also be referred to in the art as an "overlay", because it is positioned on the outer surface of the gasket. Since steel has the same thermal expansion coefficient as the metal used in the tubular members, it does not have problems associated with a solid stainless steel gasket, as discussed above. Since the inlay of stainless steel is thin compared to the cross section of the gasket body, the overall expansion coefficient of the composite gasket is very close to that of a conventional, solid steel gasket. This composite expansion coefficient is also similar to that which is known on a corrosion resistant alloy-inlaid seal preparation on a wellhead.

In addition to the stainless inlay, the gasket may also be coated overall with a thin coating, typically on the order of 0.001–0.002", such as silver, tin, molybdenum di-sulfide, or a flouropolymer such as Xylan™ to further reduce the overall corrosion potential of the gasket. Such coatings also reduce friction and help prevent galling. A primary gasket and a back-up gasket may both be included. If the primary gasket does not seal, then the secondary gasket may be employed to seal the upper and lower coaxial tubular members together.

Each of the primary and secondary gaskets may be of the DX type for containing pressure within the flow passage through the pair of tubular members. The gaskets may also be most other types having opposing conical surfaces, such as AX, BX, CX, RX, and VX. The tubular members have conical surfaces or preparations adjacent ends to receive the gasket. The inner upper and lower portions or "legs" of the gasket are so shaped as to be flexed inwardly as the members are drawn together, thus imparting high stress to the mating surfaces of the gasket legs and conical surfaces of the members.

The gasket, whether a primary or a secondary gasket, comprises a main body of conventional alloy or carbon steel, which is not corrosion resistant, and at least one outer weld inlay of stainless steel or other corrosion resistant material sealingly engageable with a respective conical inner surface of the tubular members. The conical inner surfaces of the tubular members may also be defined by an inlay of corrosion resistant alloy steel With respect to both embodiments having primary gaskets and embodiments having backup gaskets, the tubular members are axially urged toward each other, such as by a mechanical dog connection outside the tubular members. A shoulder on one tubular member lands on a shoulder of another tubular member. When installing a primary type gasket, after the shoulders are landed, the sealing surfaces of the primary gasket will have engaged the sealing surfaces of the tubular members, and may leave a slight gap axially inwardly of the sealing surfaces. The gap, if desired, may ensure proper seating of sealing surfaces. In some embodiments the "gap" is zero, to further support the gasket under high pressure. If there is leakage past the primary seal, it is replaced by the back-up or secondary gasket. When installing a backup gasket, after the shoulders have landed, the sealing surfaces of the backup gasket will have engaged the sealing surfaces of the tubular members. However, the gap about a backup gasket discussed herein will be axially outwardly of the sealing surfaces. Each of the gaskets may or may not have ports arranged to permit leakage of the contained pressure to pass outwardly through adjacent ends of the tubular member without passing through the gaps.

The foregoing features and advantages of the present invention will be more fully understood and better appreciated by reference to the following description and drawings.

DESCRIPTION OF THE INVENTION

The present invention is ideal for joining tubulars used in the hydrocarbon recovery industry, and is illustrated and explained in this context. It should be noted, however, that the invention can be applied more generally in other contexts and environments wherein first and second tubular members are to be sealingly joined, and possibly exposed to wide temperature ranges.

Figure 1:
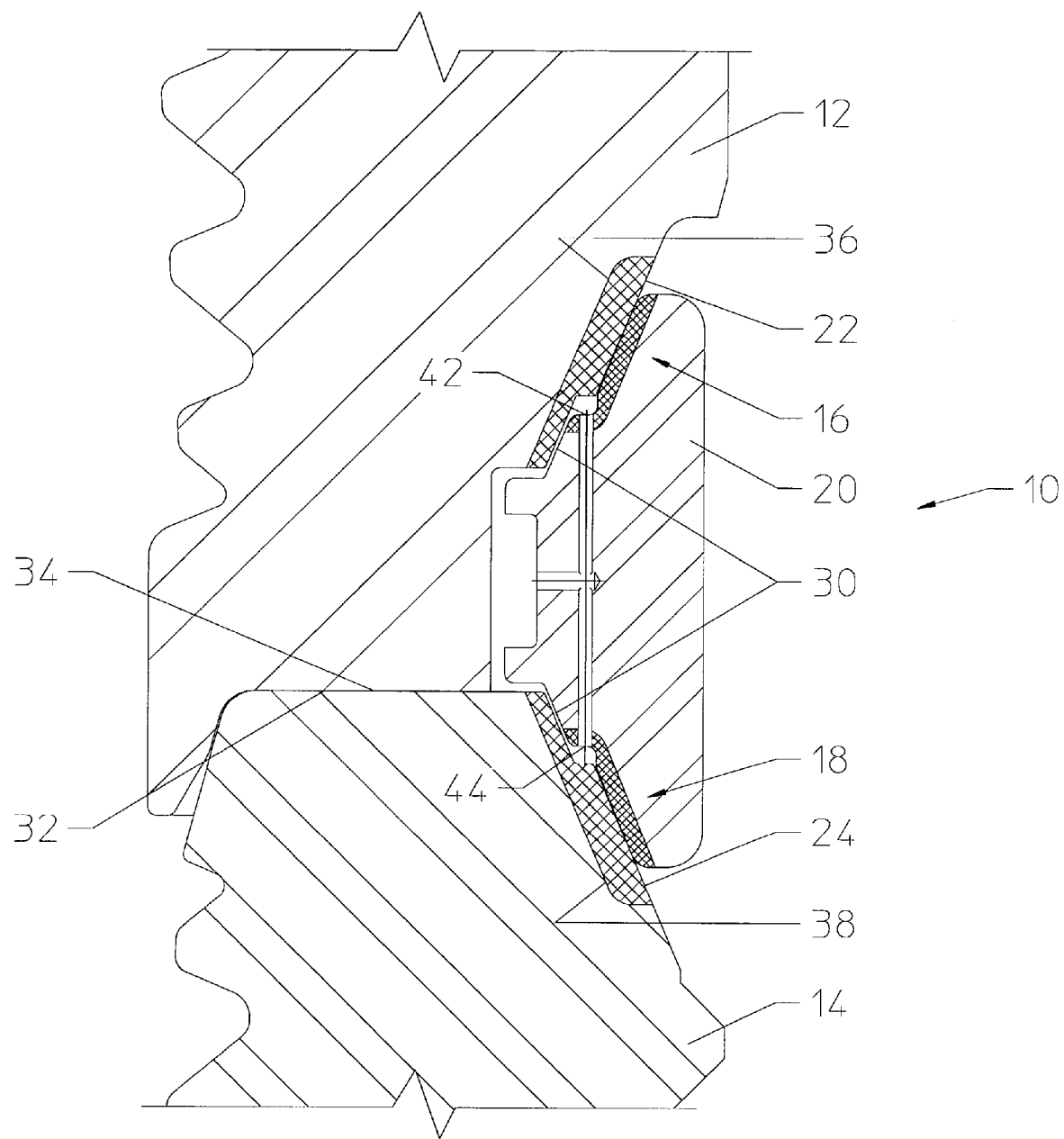
FIG. 1 illustrates a preferred embodiment of a metal sealing ring having two corrosion-resistant inlays, sealed between a first tubular member and second tubular member.
Figure 2:
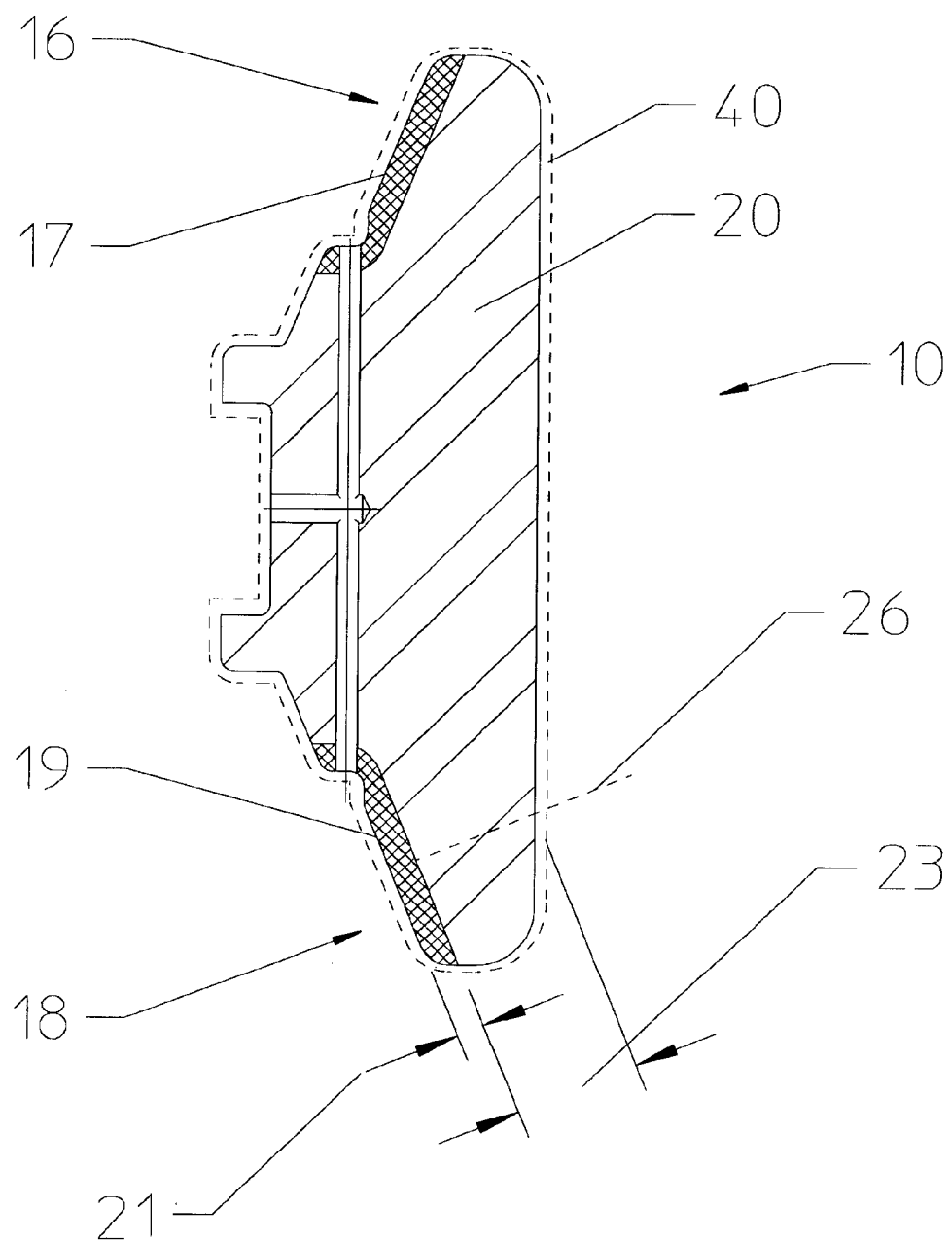
FIG. 2 illustrates a detailed view of the metal sealing ring of FIG. 1.

FIG. 1 illustrates a preferred embodiment of a composite metal sealing ring 10, shown separately in FIG. 2, for sealing between a first tubular member 12 and second tubular member 14. The sealing ring 10 has a metal body 20, and in the preferred embodiment has both first and second inlays 16 and 18, which define axially opposing, preferably conical outer sealing surfaces 17 and 19. The inlays 16,18 might also be referred to interchangeably in the art as "overlays", because they are positioned on the outer region of the gasket. Other embodiments (not shown) may include only one inlay 16 or 18, for applications in which only one corrosion resistant inlay is desired. The sealing surfaces 17, 19 seal with inner sealing surfaces 22, 24 on the first and second tubular members 12, 14. Sealing surfaces 22, 24 may be defined by inlays 36 and 38, optionally included with first and second tubular member 12, 14. The sealing ring 10 shown is a "DX" type gasket, but may also be any other gasket conventionally having opposing conical sealing surfaces, such as an AX, BX, CX, RX, and VX type gasket.

The connection between tubular members 12, 14 and the sealing ring 10 is known in the art. Tubular members 12 and 14 are axially urged toward each other, such as by a mechanical dog connection (not shown) outside the tubular members 12, 14. A shoulder 32 on tubular member 12 lands on shoulder 34 of tubular member 14. With shoulder 32 landed, the sealing surfaces 17, 19 have engaged sealing surfaces 22, 24, while a slight gap 30 remains axially inwardly of sealing surfaces 17, 19 and 22, 24. The gap 30 ensures proper seating of sealing surfaces 17, 19 with sealing surfaces 22, 24. In other embodiments, the "gap" is really zero, and there is contact at 30. In these other embodiments, contact or interference at location 30 helps support the sealing ring.

The metal body 20 has a bore, which is generally a centrally located body central bore, and is defined by the metal body 20. Each of the tubular members 12 and 14 define a bore for substantially aligning with the body central bore. The bores of the tubular members 12, 14 may or may not be centrally located with respect to the tubular member 12, 14.

One purpose of using the inlays 16, 18, in general, is to provide mechanical properties at the sealing surfaces 17, 19 which differ from mechanical properties of the metal body 20. In a particularly preferred embodiment, the metal body 20 provides the sealing ring 10 with a desired degree of expansion over a temperature range, and the inlays 16, 18 provide corrosion resistance at the sealing surfaces 17, 19 without significantly affecting the overall expansion properties of the sealing ring 10. The inlays 16 and 18 are thus preferably made of a corrosion resistant material, which will typically be a nickel-based "corrosion resistant alloy" (CRA) or a stainless steel. The sealing ring 10 will be made of a different material, typically a "conventional" low-alloy or low-carbon steel, which may also be used in the first and second tubular members. Although conventional steel is not corrosion resistant, it has a more desirable expansion coefficient, in that it expands less than stainless steel over an elevated temperature range.

This composite construction for the sealing ring 10 provides the desired corrosion protection of stainless steel with the desired expansion ratio of "conventional" carbon steels. Maximizing the benefits of this composite construction requires providing a thin inlay relative to the metal body. For purposes of illustration, a nominal inlay thickness 21 and nominal body thickness 23 may be defined as shown in FIG. 2. The nominal inlay thickness 21 may be defined as the thickness of a relatively uniform inlay 18, or an average thickness of the inlay 18 if it were not uniform. The nominal body thickness 23 may be defined as the thickness of the body 20 at a line 26 projecting orthogonally from the middle of inlay 18 and passing through the body 20. A thickness ratio may be defined as the ratio of nominal inlay thickness 21 to nominal body thickness 23. In a preferred embodiment, the thickness ratio is less than about 10%. For example, if the nominal body thickness 23 is 20 mm, a preferred nominal inlay thickness 21 is less than about 2 mm.

Another way to characterize the desired range of thickness of the inlays 16, 18 with respect to the metal body 20 is in terms of a volume percent. In preferred embodiments, the volume of material used in the inlay should be between 2% and 30% of the total volume of the gasket.

As a practical matter, the above illustrative calculations can be tedious, as sealing rings come in a variety of sized and dimensions. In most applications it will be easier to provide an inlay with a predetermined target thickness, rather than compute the desired thickness based on a nominal body thickness. Accordingly, in most applications, a desired composite expansion ratio will be realized if the inlay thickness 21 is approximately 1/8". In preferred embodiments, the inlay should not be less than 1/32" and not greater than 3/16".

Because the metal used in the metal body 20 is generally not corrosion-resistant, a thin corrosion-resistant layer 40 on the order of between 0.001" and 0.002" thick may be applied to the metal body 20, as illustrated in FIG. 2. The corrosion-resistant layer 40 may be silver, tin, molybdenum di-sulfide, or a flouropolymer such as Xylan™. These materials provide adequate corrosion resistance and durability in high pressure and high temperature environments. They also provide reduced friction and protection against galling. The corrosion-resistant layer 40 need not extend to the corrosion-resistant inlays 16, 18, but it may be easier during manufacture to apply the corrosion-resistant layer to the entire sealing ring 10 after the inlays 16, 18 have been attached to the metal body 20. The inlays 16, 18 themselves may be attached by conventional welding processes known in the art.

Carbon steels such as may be used in the metal body 20 typically have an expansion coefficient of approximately 6.0E-6 inches/inch/° F. Stainless steels typically have an expansion coefficient of approximately 7.0E-6 inches/inch/° F. Because the expansion ratio of the composite sealing ring 10 is ideally very close to that of a plain carbon steel gasket, a maximum expansion coefficient of the carbon steel body 20 should be specified of not more than 6.5E-6 inches/inch/° F., and preferably less than 6.2E-6 inches/inch/° F., each within a temperature range of between 0° F. and 350° F., which is a conventional working temperature range for sealing rings as disclosed herein.

Figure 3:
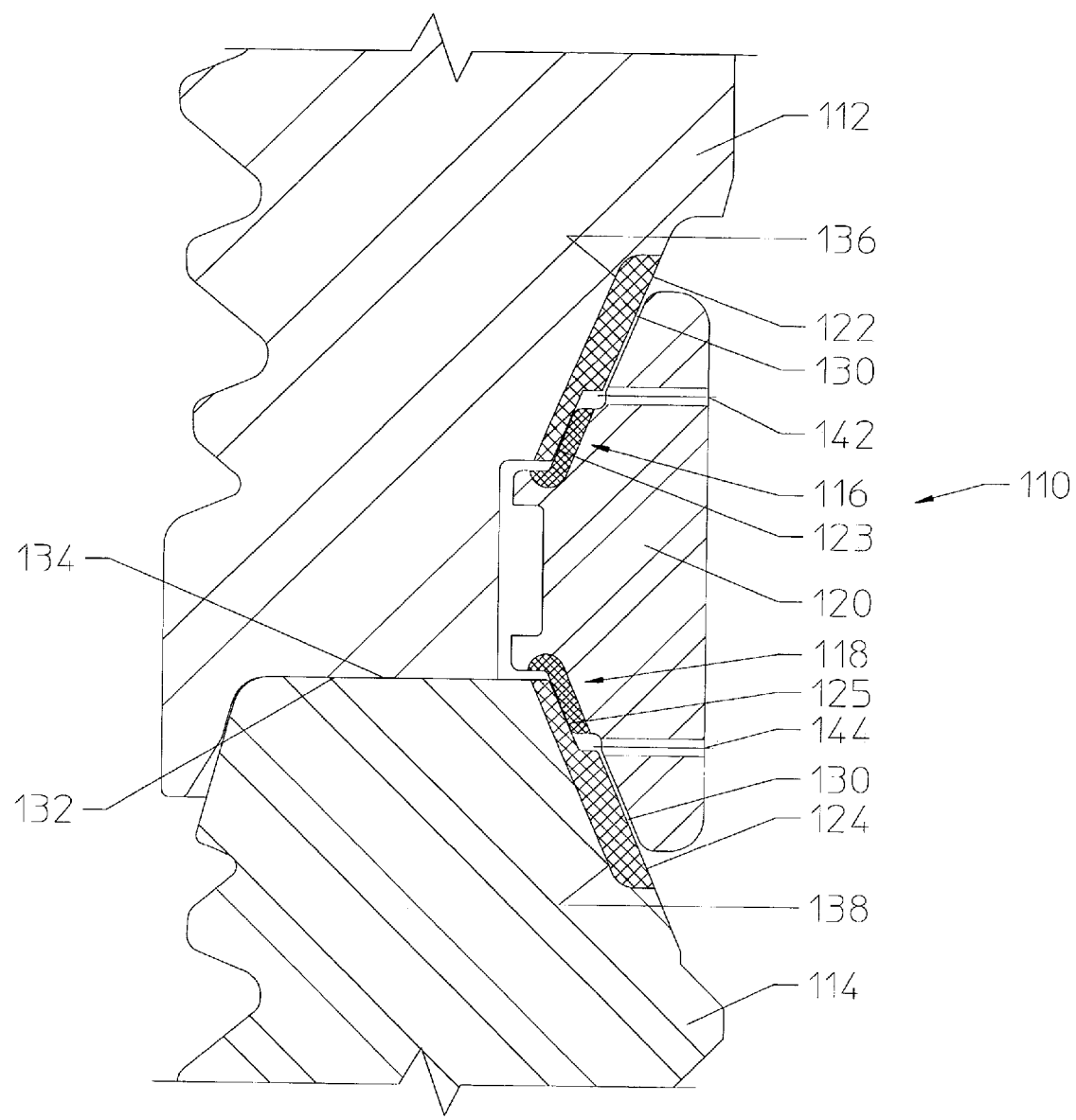
FIG. 3 conceptually illustrates a "backup" type sealing ring for sealing with a "backup" sealing surface of a tubular member in the event that a primary sealing surface of the tubular member has been damaged.
Figure 4:
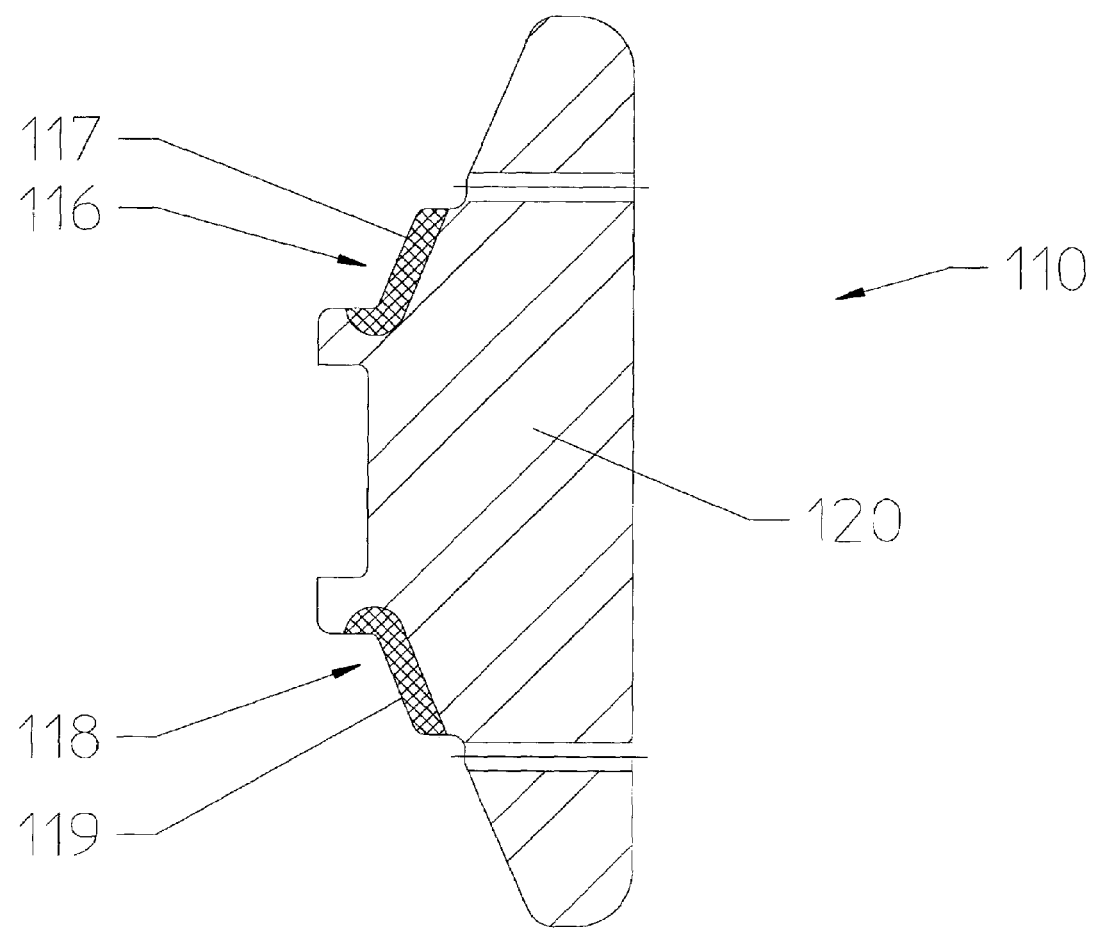
FIG. 4 illustrates a detailed view of the backup sealing ring of FIG. 3.

FIGS. 3 and 4 conceptually illustrate a "backup" type sealing ring or gasket 110 for sealing with a "backup" sealing surface of a tubular member in the event that a primary sealing surface of the tubular member has been damaged. As with the embodiments of FIGS. 1 and 2, a first and second tubular members 112, 114 are urged axially toward each other to seal with composite sealing ring 110. Sealing ring 110 includes a metal body 120 and inlays 116, 118 defining outer "backup" sealing surfaces 117, 119, which are axially inward with respect to the sealing surfaces 17, 19 of the FIG. 1 embodiment. The tubular members 112, 114 have inner "primary" sealing surfaces 122, 124, for sealing with the outer sealing surfaces 17, 19 of the type of sealing ring 10 embodied in FIG. 1. Although not shown in FIG. 3, the inlays 116, 118 may extend downward along the metal body 120, adjacent to sealing surface 122, 124 on the tubular member 112, 114. The tubular members 112, 114 further include inner backup sealing surfaces 123, 125 for sealing with the backup sealing surfaces 117, 119 of the backup sealing ring 110, in the event that primary sealing surfaces 112, 114 are damaged. The sealing surfaces 122, 124, 123, and 125 may be defined by inlays 136 and 138, optionally included with first and second tubular member 112, 114.

With a shoulder 132 of the tubular member 112 landed on a shoulder 134 of the tubular member 114, sealing surfaces 117, 119 on the sealing ring 110 seal with the respective backup sealing surfaces 123, 125 on the tubular members 112, 114, leaving a slight gap 130. The gap 130 ensures proper seating of sealing surfaces 117, 119 with sealing surfaces 123, 125, and prevents contact between the sealing ring 110 and the damaged primary sealing surfaces 122, 124. As discussed in connection with FIGS. 1 and 2, the gap 130 in other embodiments is actually a zero-gap contact, or even an interference contact at location 130.

The instant invention as applied to the embodiment of FIGS. 3 and 4 is conceptually the same as when applied to the embodiment of FIGS. 1 and 2. The purpose of using a stainless steel inlay with a conventional steel body is the same, whether using the invention with a primary or backup sealing ring. Thus, the above discussion regarding the material selection for the sealing ring and inlays applies throughout.

Each of the sealing rings 10, 110 may have ports 42, 44, and 142, 144 arranged to permit leakage of the contained pressure to pass outwardly through adjacent ends of the tubular member without passing through the gaps 30, 130. These ports 42, 44, and 142, 144 are shown in FIGS. 1 and 3 respectively.

In preferred embodiments, the sealing surfaces such as 17, 19, 117, 119, 22, 24, 122, 124, 123, and 125 are all conical. In less preferred embodiments not shown, sealing surfaces need not be conical. For example, a substantially spherical outer surface of a gasket may seal against an inner surface (conical or otherwise) of a tubular member.

In some embodiments, a second body may be used instead of a second tubular member. The second body need not be tubular, and need not have a bore. For example, the second body may simply be an end flange, and the sealing ring may seal between a first tubular member and the end flange. In such an embodiment, the first tubular member seals with a first outer sealing surface on a gasket metal body, and the end flange may seal with a second outer sealing surface on the metal body. Thus, pressure may be contained between the end flange, a bore of the metal body, and a bore of the first tubular member.

Although specific embodiments of the invention have been described herein in some detail, it is to be understood that this has been done solely for the purposes of describing the various aspects of the invention, and is not intended to limit the scope of the invention as defined in the claims which follow. Those skilled in the art will understand that the embodiment shown and described is exemplary and various other substitutions, alterations, and modifications, including but not limited to those design alternatives specifically discussed herein, may be made in the practice of the invention without departing from the spirit and scope of the invention.

The invention claimed is:

1. A composite metal sealing ring for sealing between a first and second tubular members, the first tubular member having a first bore and a first conical inner sealing surface, the second tubular member having a second bore and a second conical inner sealing surface, the metal sealing ring comprising:

a carbon steel body having a body central bore substantially aligned with the first and second bores of the first and second tubular members;

a first conical outer sealing surface on the carbon steel body for sealing with the first conical inner sealing surface;

a second conical outer sealing surface on the carbon steel body axially opposing the first conical outer sealing surface for sealing with the second conical inner sealing surface;

at least one of a first and second inlay secured to the carbon steel body by welding and comprising one of a stainless steel and a corrosion resistant alloy and defining a respective one of the first and second conical outer sealing surfaces on the carbon steel body, a nominal inlay thickness being less than about 10% of a nominal carbon steel body thickness; and an expansion coefficient of the carbon steel body is less than 6.5E-6 inches/inch/°F., and approximates an expansion coefficient of the first and second tubular members, and an expansion coefficient of the at least one of the first and second inlay does not approximate the expansion coefficient of the first and second tubular members.

2. A composite metal sealing ring as defined in claim 1, wherein a nominal inlay thickness is between about $\frac{1}{32}$" and $\frac{3}{16}$".

3. A composite metal sealing ring as defined in claim 1, wherein a nominal inlay volume is between 2% and 30% of a nominal total volume of the composite metal sealing ring.

4. A composite metal sealing ring as defined in claim 1, further comprising:

a corrosion-resistant coating on the carbon steel body.

5. A composite metal sealing ring as defined in claim 4, wherein the corrosion-resistant coating is selected from the group consisting of silver, tin, molybdenum di-sulfide, and fluoropolymer.

6. A composite metal sealing ring as defined in claim 1, wherein at least one of the first and second inner conical sealing surfaces includes a backup sealing surface adjacent a respective primary conical sealing surface; and the at least one of the first and second conical outer sealing surfaces on the carbon steel body defined by the at least one of the first and second corrosion-resistant inlays seals with the backup sealing surface.

7. A composite metal sealing ring as defined in claim 1, further comprising:

the metal sealing ring is selected from the group consisting of an AX type, BX type, CX type, DX type, RX type, and VX type gasket.

8. A composite metal sealing ring for sealing between a first and second members, the first member having a central bore and a first conical inner sealing surface, the second member having a central bore and a second conical inner sealing surface, the composite metal sealing ring comprising:

a metal body comprising one of a carbon steel and a low alloy steel, the metal body having a body central bore substantially aligned with the central bores of the first and second members;

a first conical outer sealing surface for sealing with the first conical inner sealing surface;

a second conical outer sealing surface axially opposing the first conical outer sealing surface for sealing with the second conical inner sealing surface;

at least one of a first and second corrosion-resistant inlay comprising one of stainless steel and corrosion resistant alloy secured to the metal body by welding, the corrosion-resistant inlay defining a respective at least one of the first and second conical outer sealing surfaces and having a nominal inlay thickness of between about $\frac{1}{32}$" and $\frac{3}{16}$"; and an expansion coefficient of the metal body is less than 6.5E-6 inches/inch/°F., and approximates an expansion coefficient of the first and second tubular members, and an expansion coefficient of the at least one of the first and second inlay does not approximate the expansion coefficient of the first and second tubular members.

9. A composite metal sealing ring as defined in claim 8, further comprising:

a corrosion-resistant coating on the metal body.

10. A composite metal sealing ring as defined in claim 9, wherein the corrosion-resistant coating is selected from the group consisting of silver, tin, molybdenum di-sulfide, and fluoropolymer.

11. A composite metal sealing ring as defined in claim 8, wherein at least one of the first and second inner conical sealing surfaces is a backup sealing surface adjacent a respective primary conical sealing surface; and the at least one of the first and second conical outer sealing surfaces defined by the at least one of the first and second corrosion-resistant inlays seals with the backup sealing surface.

12. A method of sealing between a first and second members, the first member having a central bore and a first conical inner sealing surface, the second member having a central bore and a second conical inner sealing surface, the method comprising:

providing a steel body having a body central bore;

substantially aligning the body central bore with the central bores of the first and second members;

providing a first conical outer sealing surface for sealing with the first conical inner sealing surface;

providing a second conical outer sealing surface axially opposing the first conical outer sealing surface for sealing with the second conical inner sealing surface;

welding at least one of a first and second corrosion-resistant inlays comprising one of stainless steel and a corrosion resistant alloy to the steel body to define a respective at least one of the first and second conical outer sealing surfaces, an expansion coefficient of the steel body is less than 6.5E-6 inches/inch/°F., and approximates an expansion coefficient of the first and second tubular members, and an expansion coefficient of the at least one of the first and second inlays does not approximate the expansion coefficient of the first and second tubular members, and a nominal inlay thickness of at least one of the first and second inlays is between about $\frac{1}{32}$" and $\frac{3}{16}$"; and axially urging the first and second members toward one another, to sealingly engage the first conical outer sealing surface with the first conical inner sealing surface and sealingly engage the second conical outer sealing surface with the second conical inner sealing surface.

13. A method as defined in claim 12, further comprising: selecting a nominal inlay thickness less than about 10% of a nominal steel body thickness.

14. A method as defined in claim 12, further comprising: selecting a nominal inlay volume between 2% and 30% of a nominal total volume of the composite metal sealing ring.

15. A method as defined in claim 12, further comprising: coating the steel body with a corrosion-resistant coating.

16. A method as defined in claim 15, further comprising: selecting the corrosion-resistant coating from the group consisting of silver, tin, molybdenum di-sulfide, and fluoropolymer.

17. A method as defined in claim 12, wherein at least one of the first and second inner conical sealing surfaces is a backup sealing surface adjacent a respective primary conical sealing surface; and the at least one of the first and second conical outer sealing surfaces defined by the at least one of the first and second corrosion-resistant inlays seals with the backup sealing surface.

18. A method as defined in claim 12, further comprising: selecting a shape from the group consisting of AX, BX, CX, DX, RX, and VX type gaskets.

19. A composite metal sealing ring for sealing with a first member, the first member having a first bore and a first frustoconical inner sealing surface, the composite metal sealing ring comprising:

a steel body having a body central bore substantially aligned with the first bore of the first member;

the first inner sealing surface having one of a stainless steel and corrosion-resistant alloy inlay welded to the first member and defining the first inner sealing surface, a nominal inlay volume being between 2% and 30% of a nominal total volume of the composite metal sealing ring;

a first frustoconical outer sealing surface on the steel body for sealing with the first inner sealing surface; and another corrosion-resistant inlay formed from a stainless steel or a corrosion-resistant alloy and welded to the steel body, the another inlay defining the first outer sealing surface on the steel body;

an expansion coefficient of the carbon steel body is less than 6.5E-6 inches/inch/°F., and approximates an expansion coefficient of the first and second tubular members, and an expansion coefficient of the at least one of the inlay and the another inlay does not approximate the expansion coefficient of the first and second tubular members.

20. A composite metal sealing ring as defined in claim 19, further comprising:

a second outer sealing surface on the steel body opposite the first outer sealing surface, the second outer sealing surface for sealing with a second inner sealing surface of a second tubular member, the second tubular member having a second bore substantially aligned with the body central bore.

21. A composite metal sealing ring as defined in claim 20, further comprising:

a second corrosion-resistant inlay defining the second outer sealing surface on the steel body.

22. A composite metal sealing ring as defined in claim 20, wherein at least one of the second outer sealing surface on the steel body and the second inner sealing surface on the second tubular member is frustoconical.

23. A composite metal sealing ring as defined in claim 19, further comprising:

a second outer sealing surface on the steel body opposite the first outer sealing surface, the second outer sealing surface for sealing with a second sealing surface of a second body, the second body comprising an end flange.

24. Composite metal sealing rings for sealing between first and second members, the first member having a central bore and first conical primary and first conical backup inner sealing surfaces, the second member having second conical primary and second conical backup inner sealing surfaces, the composite metal sealing rings comprising:

a metal primary and a backup metal body each comprising one of a carbon steel and a low alloy steel, each metal body having a body central bore substantially aligned with the central bore of the first member;

a first conical primary outer sealing surface on the primary metal body for sealing with the first conical primary inner sealing surface;

a first conical backup outer sealing surface on the backup metal body for sealing with the first conical backup inner sealing surface, the first conical backup inner sealing surface being spaced from a cone defining the first conical primary inner sealing surface;

a second conical primary outer sealing surface on the metal body for sealing with the second conical primary inner sealing surface;

a second conical backup outer sealing surface on the backup metal body for sealing with the second conical backup inner sealing surface, the second conical backup inner sealing surface being spaced from a cone defining the second conical primary inner sealing surface;

a primary and a backup corrosion-resistant inlay each comprising one of a stainless steel and a corrosion resistant alloy secured by welding to the metal body and the backup metal body, respectively, the primary corrosion-resistant inlay defining a respective one of the first and second conical primary outer sealing surfaces, the backup corrosion resistant inlay defining a respective one of the first and second conical backup outer sealing surfaces, and each inlay having a nominal inlay thickness between about 1/32" and 3/16"; and an expansion coefficient of each of the primary metal body and the backup metal body is less than 6.5E-6 inches/inch/°F., and approximates an expansion coefficient of the first and second tubular members, and an expansion coefficient of the primary and backup inlay does not approximate the expansion coefficient of the first and second tubular members.

25. Composite metal sealing rings as defined in claim 24, further comprising:

a corrosion-resistant coating on the primary metal body.

26. Composite metal sealing rings as defined in claim 25, wherein the corrosion-resistant coating is selected from the group consisting of silver, tin, molybdenum di-sulfide, and fluoropolymer.

27. Composite metal sealing rings as defined in claim 24, wherein a nominal thickness of the primary inlay is less than about 10% of a nominal primary metal body thickness.

28. Composite metal sealing rings as defined in claim 24, wherein a nominal volume of the primary inlay is between 2% and 30% of a nominal total volume of the primary metal body.

29. Composite metal sealing rings as defined in claim 24, wherein the first conical primary inner sealing surface has one of a stainless steel and corrosion-resistant alloy inlay welded to the first member and defining the first conical primary inner sealing surface.

* * * * *